May 4, 1954
C. F. SCHAEFER
2,677,286
OUTPUT SHIFTING APPARATUS
Filed Jan. 18, 1950
3 Sheets-Sheet 1
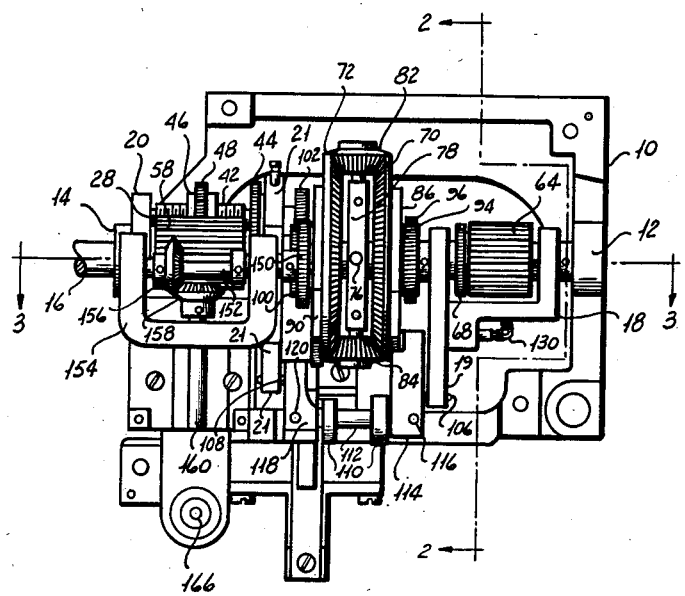
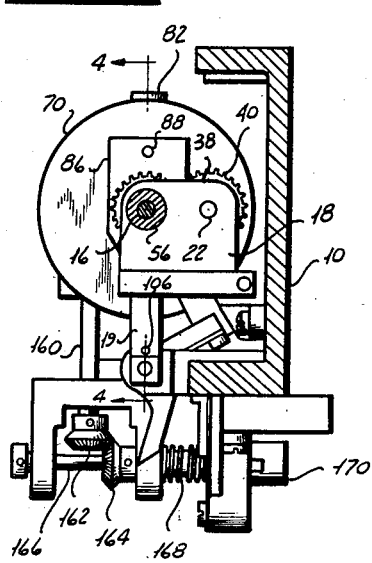
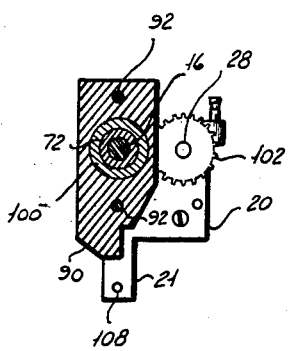
INVENTOR.
CARL F. SCHAEFER
BY
Henry L. Shenier
ATTORNEY

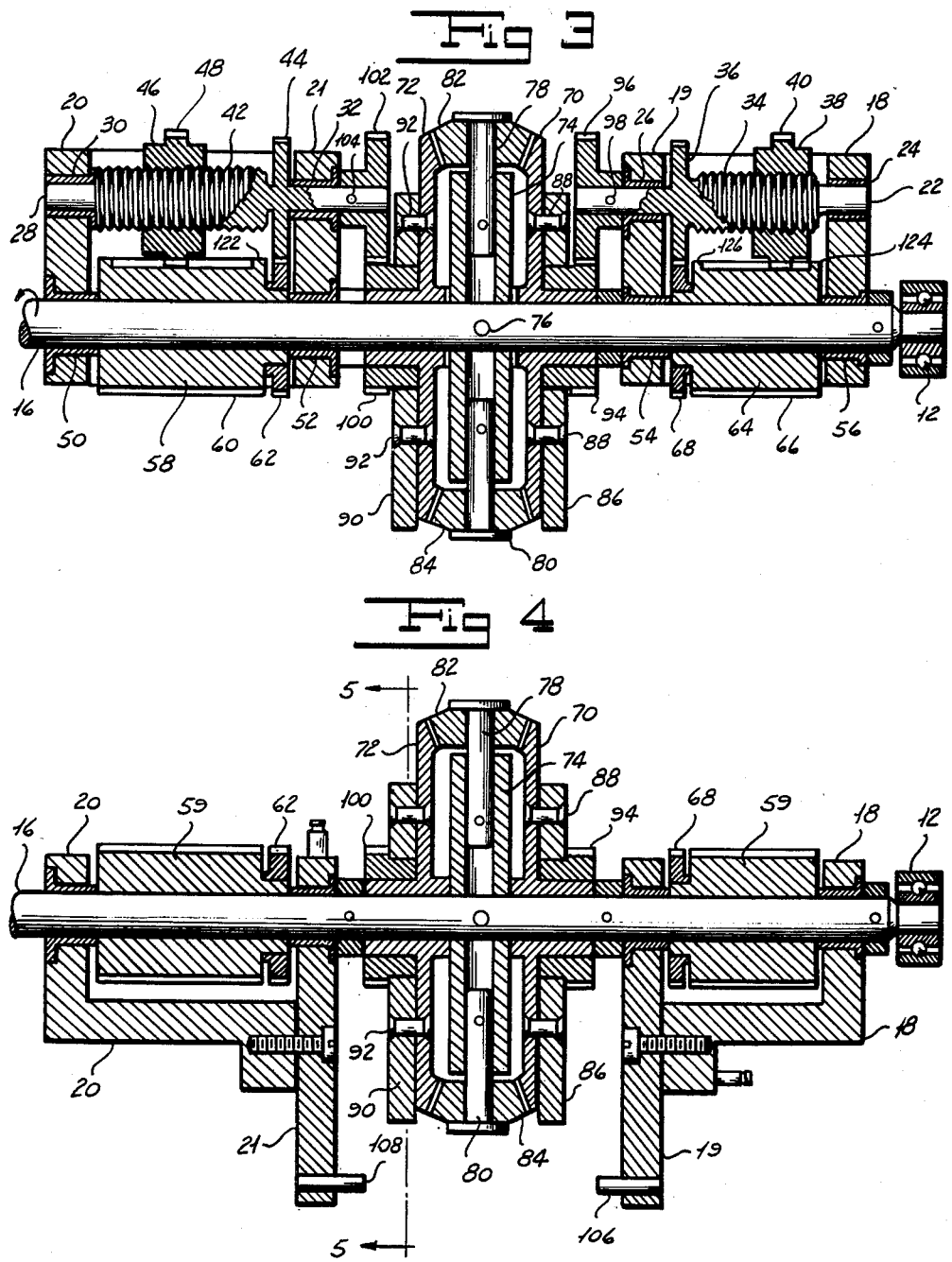

May 4, 1954  C. F. SCHAEFER  2,677,286
OUTPUT SHIFTING APPARATUS
Filed Jan. 18, 1950  3 Sheets-Sheet 3

INVENTOR.
CARL F. SCHAEFER
BY
Henry L. Shenier
ATTORNEY

Patented May 4, 1954

2,677,286

UNITED STATES PATENT OFFICE 2,677,286

OUTPUT SHIFTING APPARATUS

Carl F. Schaefer, Port Washington, N. Y., assignor to The Norden Laboratories Corporation, New York, N. Y., a corporation of Connecticut Application January 18, 1950, Serial No. 139,291

9 Claims. (Cl. 74—674)

My invention relates to an output shifting apparatus and more particularly to a device for transferring input mechanical energy from a source of energy from one output channel to another output channel at a predetermined point.

It is frequently desirable in many applications to drive a member from a driving means until a predetermined condition is reached, after which it is desired to drive another driven member from the same driving means, and in the reversal of the motion to disconnect the driving means from the second driven member and pick up the first driven member at exactly the same point at which the drive to this member was disconnected. Another aspect of the same problem is to drive a first member until a predetermined condition is reached, and then disconnect the driven member from the drive permitting the driving member to idle, and in the reversal of the motion to again connect the driven member to the driving member at exactly the same point at which the driving means was rendered inoperative with respect to the driven member. For example, where the driven member represents a predetermined function in a computer mechanism this function may become so large that it will exceed the limit of the capacity of the computer and provision must be made to render the driving means ineffective with respect to the driven member. In the reversal of the process the driven member must be picked up and rendered effective to be driven by the driving member at exactly the same point at which it was dropped. By way of illustration and not by way of limitation, let us assume that a driving member is being rotated as a function of the tangent of an angle. As the angle approaches 90° the tangent will approach infinity and a point soon will be reached beyond the capacity of the computer, which may still have to run for other purposes. Under these circumstances it becomes imperative to disconnect the driving means from the driven means. It is also necessary to endow the disconnecting means with a "memory" so that it will again pick up the driven means at exactly the point at which it was dropped.

One object of my invention is to provide a device having an input shaft and a pair of output shafts with means for shifting the input from one of the output shafts to the other at a predetermined point in the rotation of the input shaft.

Another object of my invention is to provide a device having an input shaft and an output shaft and means for disconnecting the output shaft from the input shaft at a predetermined point of travel of the input shaft, and upon reversal of the direction of travel of the input shaft to again connect the output shaft with the input shaft at exactly the point at which it was dropped.

Another object of my invention is to provide a continually driven input shaft with means for shifting the output from one driven means to another at a predetermined point.

Other and further objects of my invention will appear from the following description.

In the accompanying drawings which form part of the instant specification and which are to be read in conjunction therewith, and in which like reference numerals are used to indicate like parts in the various views:

Figure 1 is a plan view of an assembly containing one embodiment of my invention.

Figure 2 is a sectional view taken along the line 2—2 of Figure 1.

Figure 3 is a sectional view drawn on an enlarged scale taken along the line 3—3 of Figure 1.

Figure 4 is a sectional view drawn on an enlarged scale taken along the line 4—4 of Figure 2.

Figure 5 is a fragmentary sectional view drawn on a smaller scale viewed along the line 5—5 of Figure 4.

Figure 6:
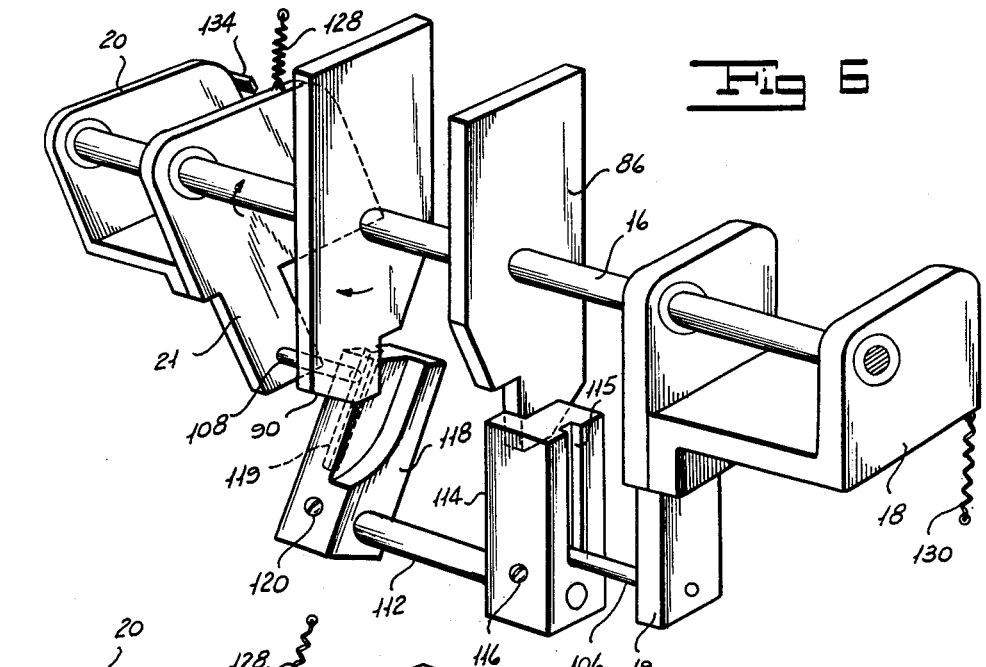
Figure 6 is a schematic perspective view showing a detail of a locking assembly with one output channel locked.

Referring now to the drawings, a frame 10 of any suitable construction is provided with a pair of bearings 12 and 14 in which a shaft 16, which is the input shaft, is adapted to rotate. A bracket 18 is rotatably mounted about shaft 16 adjacent bearing 12 by means of bushings 54 and 56. A bracket 20 is rotatably mounted about shaft 16 by means of bushings 50 and 52 adjacent bearing 14. As will be pointed out more fully hereinafter, an angle of 60° normally exists between the axes of the brackets, and this is shown in Figure 1. For purposes of convenience in explanation and clarity in understanding the construction, the brackets have been shown as symmetrically disposed in Figures 3 and 4.

A shaft 22 is mounted for rotation in bracket 18 in bushings 24 and 26. Similarly a shaft 28 is rotatably carried by the bracket 20 in bushings 30 and 32. Secured to the shaft 22 for rotation therewith is a screw 34 provided with a gear 36, A nut 38 threadedly engages the screw 34 and is formed with external gear teeth 40. Similarly, a screw 42 is secured to the shaft 28 for rotation therewith and is formed integrally with a gear 44. An internally threaded member or nut 46 is threadedly engaged with the screw 42 and is formed with gear teeth 48. A gear 58 having elongated gear teeth 60 is rotatably carried by the shaft 16 in the bracket 20 with the teeth 60 of the wide gear 58 in engagement with the teeth 48 of the nut 46. The wide gear 58 is secured to a gear 62 the teeth of which mesh with the gear 44 formed on the screw 42. Similarly, a wide gear 64 having elongated teeth 66 is rotatably mounted upon the shaft 16 within the bracket 18 with the teeth 66 of the wide gear 64 meshing with the teeth 40 of the nut 38. A gear 68 is secured to the wide gear 64 for rotation therewith and its teeth mesh with the teeth of gear 36, as can readily be seen by reference to Figure 3. Intermediate the brackets 18 and 20 I position a differential comprising a side gear 70 rotatably mounted upon the shaft 16, a second side gear 72 likewise rotatably mounted upon shaft 16 and a crosshead 74 secured to the shaft 16 by a pin 76 so the crosshead will be constrained to rotate with shaft 16. Stub shafts 78 and 80 are carried by the crosshead 74. A gear 82 which meshes with both side gears 70 and 72 is rotatably carried by the stub shaft 78. A gear 84 meshing with side gears 70 and 72 is rotatably carried by the stub shaft 80. A locking arm 86 is secured to the side gear 70 by rivets 88. Similarly, a locking arm 90 is secured to the side gear 72 by rivets 92. The arms 86 and 90 are adapted to be selectively locked in a manner which will be pointed out more fully hereinafter. A gear 94 is secured to the side gear 70 for rotation therewith and meshes with a gear 96 carried by the shaft 22 and pinned thereto by pin 98 for rotation therewith. A gear 100 is secured to the side gear 72 for rotation therewith and meshes with a gear 102 which is pinned by pin 104 to the shaft 28 so that the gear 102 will rotate therewith. An arm 19 having a pin 106 is secured to the bracket 18. An arm 21 is secured to the bracket 20 and is provided with a pin 108. The frame 10 is provided with a pair of upwardly directed brackets 110 in which I pivot a shaft 112. A locking arm 114 is pinned to the shaft 112 by means of pin 116. A second locking arm 118 is pinned to the shaft 112 by means of pin 120. The arms 114 and 118 are secured to the shaft 112 so that they make an angle of 60° with each other. Arm 114 is adapted to coact with arm 19 to lock side gear 72, and arm 21 is adapted to coact with arm 118 to lock differential side gear 70, as will be hereinafter more fully described. In this locking action arm 86 coacts with arm 114, and arm 90 coacts with arm 118.

Let us now assume that arm 86 is locked and that shaft 16 is rotating in a counterclockwise direction as viewed from the left. Since side gear 70 is secured to arm 86 it will be locked. The rotation of the crosshead 74 will carry the gears 82 and 84 around in mesh with the locked side gear 70. This will cause the gear 82 to rotate in a clockwise direction viewed from above and hence drive the side gear 72 in a counterclockwise direction viewed from the left, thus driving the gear 100 in a counterclockwise direction. A spring is provided urging the bracket 20 to rotate in a clockwise direction to prevent it from turning with the shaft 16. The gear 100 meshes with the gear 102 rotating it and gear 44 as well as screw 42. The gears 102 and 44 will be driven in a clockwise direction as viewed from the left. The gear 44 meshes with the gear 62 thus driving the wide gear 58 in a clockwise direction. There is a difference of one tooth between gears 44 and 62. The rotation of the screw 42 relative to the nut 46 will advance the nut either to the right or to the left depending on the direction of pitch of the coacting threads. Let us assume that the rotation of the screw 42 will tend to move the nut 46 to the right as viewed in Figure 3. The nut, however, is being rotated by the rotation of the wide gear 60 in the same direction as the rotation of the screw 42. If the speed of rotation of the nut were the same as the speed of rotation of the screw, the nut would remain stationary and not advance along the screw. Since, however, the gear 62 has one tooth more than the gear 44, the screw will rotate slightly faster than the speed at which the nut rotates depending on the ratio of the number of teeth in the gears 44 and 62. This will cause the nut to travel to the right, as viewed in Figure 3. One end of the intertooth space of the gear teeth 60 is provided with a stop 122 which will lock gears 48 and 60. When this occurs gear 102 will be locked, and since it can no longer turn, the gear 100 will rotate the bracket 20 in a counterclockwise direction with the shaft 16 bringing it from the position shown in Figure 3 to the position shown in Figure 4, rotating the arm 21 in a counterclockwise direction. The position of the stop contacting tooth of the gear 48 with respect to the stop 122 is a record of the number of revolutions of the side gear 72 and hence a form of revolution counter. The pin 108 at the end of arm 21 will carry the arm 118 upwardly as viewed in Figure 1, and the arm 114 upwardly. The pin 106 which is carried by the end of the arm 19 will be moved upwardly, thus rotating the bracket 18 in a counterclockwise direction and locking arm 114 from rotary movement. The locking of arm 114 will immobilize it and arm 118, thus locking the arm 90 which coacts with the arm 118 and hence locking side gear 72 while simultaneously freeing side gear 70. The rotation of the shaft 16 will then be transferred through the gears 82 and 84 to rotate side gear 70 in a counterclockwise direction. The rotation of side gear 70 will rotate the gear 94 which meshes with the gear 96, thus rotating the shaft 22 and screw 34 and gear 36 attached thereto. The gear 36 meshes with the gear 68 which drives the wide gear 64 which in turn meshes with the gear teeth 40 formed on the nut 38. The interaction of gears 36, 68, 66 and 40 is the same as that described with respect to gears 44 and 62 and gears 60 and gear teeth 48. The result will be that the screw 34 will rotate slightly faster than the nut 38 so that the nut will travel to the right until the stop member 124 formed at the end of the innertooth space of gear 66 is contacted by the gear teeth 40. This is the extreme limit of rotation of the shaft 16 in a counterclockwise direction. In the applications used this will be beyond the limit of motion before a reversal of direction of shaft 16 would normally take place. When shaft 16 rotates in a clockwise direction the nut 38 will move to the left until one of the gear teeth 40 contacts a left-hand stop member 126 formed in the intertooth space of the gear 64. When this occurs gear 66 will be locked, thus immobilizing gear 68 and hence gear 36. Immobilization of gear 36 will stop the rotation of the shaft 22 and hence the gear 96. The clockwise rotation of the gear 94 will thus carry the arm 19 in a clockwise direction moving the pin 106 downwardly, as viewed in Figure 1. This will move the arm 114 downwardly and carry arm 118 downwardly simultaneously locking the arm 86 and freeing the arm 90. This will lock the side gear 70 and free the side gear 72. This action will take place in the reverse direction at exactly the same point in the rotation of shaft 16 as it occurred when the shaft was rotating in the counterclockwise direction.

Figure 7:
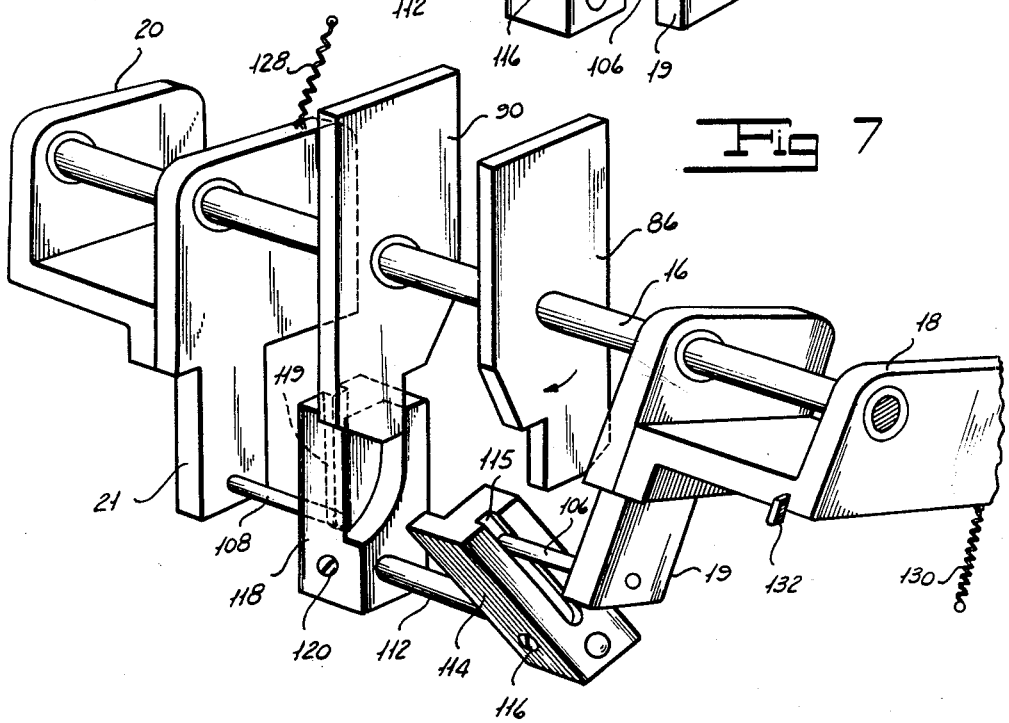
Figure 7 is a view similar to Figure 6 showing the parts in position with the other output channel locked.

The locking action can be best understood by referring to Figures 6 and 7. The bracket 20 is shown without its associated gears and screw. The spring 128 urges the bracket 20 to rotate in a clockwise direction viewed from the left. It will be observed that the arm 90 is shown independent of the side gear 70 of the differential gear to which it is attached and is, in Figure 6, free to rotate in a counterclockwise direction in which the shaft 16 is being driven. The arm 21 carrying the pin 108 makes an angle of approximately 90° with the arm 118. The arm 86 is prevented from rotating by the arm 114. Arm 114 in turn is prevented from rotating by the arm 118 which is in dead center position with respect to the pin 108. This pin is lodged in a slot 119 formed in the arm 118 so that arm 118 cannot be rotated by means of arm 114 due to the fact that both arms 118 and 114 are secured to the same shaft 112. The arm 19 carrying the pin 106 is likewise locked since the pin 106 is lodged in a slot 115 formed in the arm 114 so that the bracket 18 is likewise immobilized. As viewed in Figure 6, then, the arm 90 is free. The bracket 20 is being urged to rotate in a clockwise direction as viewed from the left by the spring 128. The angle between arm 118 and arm 21 is approximately 90°, that is on dead center. This dead center position locks arm 118 and hence locks arm 114, arm 86, arm 19 and the bracket 18.

When the nut 46 locks and the bracket 20 is carried around in a clockwise direction viewed from the right against the action of the spring 128 the arm 21 will rotate in a clockwise direction viewed from the right and will move from the position shown in Figure 6 to the position shown in Figure 7. This carries the pin 108 downwardly, as viewed in Figures 6 and 7, and rotates the arm 118 in a counterclockwise direction viewed from the right, that is, from the position shown in Figure 6 to the position shown in Figure 7. This will rotate the shaft 112 and hence the arm 114. As the arm 114 rotates the pin 106 carried by the arm 19 will move upwardly until the arm 19 forms an angle of 90° with the arm 114. When arm 114 is locked arm 118 is locked, thus locking arm 90 and hence side gear 72 to which it is attached. The rotation of arm 114 to the position shown will free arm 86 and hence the side gear 70 to which it is secured. The arm 19 is urged to rotate in a clockwise direction, as viewed in Figure 7, by means of spring 130. A stop member 132 stops the rotation of the bracket 18 and hence the arm 19 at a position at which the arm 19 makes an angle of 90° with the arm 114 to ensure that the parts will be held in a dead center position. Similarly, a stop member 134 as shown in Figure 6 stops the rotation of bracket 20 under the influence of spring 128 when arm 21 makes an angle of 90° with arm 118. By disposing arm 114 at an angle of 60° with respect to arm 118 it is only necessary that bracket 20 or bracket 18 rotate through an angle of 30° to accomplish the transfer of the output.

In Figure 1 the output is removed through a gear 150 which meshes with gear 100. The gear 150 is secured to a shaft 152 mounted for rotation in a bracket 154 carried by the frame 10. A bevel gear 156 is secured to shaft 152 for rotation therewith and meshes with a bevel gear 158 secured to a shaft 160 for rotation therewith. The shaft 160 carries a bevel gear 162, as can be seen by reference to figure 2, and this meshes with a second bevel gear 164 secured to an output shaft 166. A spring 168 normally urges the bevel gear 164 into engagement with the bevel gear 162. The member 170 is the driven member to which the output of shaft 16 passes whenever the side gear 72 is free. When the side gear 72 is locked the output may be taken from the gear 94. In the drawings I have shown no output gearing associated with gear 94 as in many instances it is necessary only to cut in and cut out the output shaft at predetermined points. In other words, the output is taken up to a point beyond which it can no longer be handled by the apparatus receiving the output. As for example in a computer when the input value is so large as to exceed the limits which can be handled by the computer the output is transferred from the output member 170 to the idle gear 94. The shaft 16 may be doing other work which may be necessary. When the process is reversed the combination is such that the output shaft 170 will again be rendered operative at exactly the same point at which it was rendered inoperative.

It will be seen that I have accomplished the objects of my invention. I have provided a device having an input shaft and one or two output shafts with means for shifting the input motion from one of the output shafts to either another output shaft or disconnecting it from the first output shaft at a predetermined point in the rotation of the input shaft. In my construction, upon the reversal of the direction of travel of the input shaft the first output shaft is again connected to the input shaft at precisely the point at which the output was shifted from it. In my construction the input shaft is continuously driven while the output is shifted from and to a shaft at a predetermined point.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention what I claim is:

1. An output shifting apparatus including in combination an input shaft, a differential having a pair of side gears and a third gear meshing with both of said side gears, means for rotatably mounting said third gear, means for driving said mounting means from said input shaft, a pair of output shafts, means for driving one of the output shafts from one of said side gears, means for driving the other of said output shafts from the other of said side gears, means for immobilizing one of said side gears, means responsive to a predetermined number of rotations of the free side gear for freeing the immobilized side gear and means responsive to said predetermined rotation of the free side gear for substantially simultaneously locking the same.

2. An output shifting apparatus as in claim 1 in which said means responsive to a predetermined number of rotations of the free side gear includes a revolution counter having an arm normally locking the other side gear, means carried by the free side gear for actuating said revolution counter, said revolution counter having means for rotating said locking arm to unlocking position after a predetermined number of revolutions of said free side gear.

3. An output shifting apparatus including in combination an input shaft, a differential having a pair of side gears and a third gear meshing with both side gears, means for rotatably mounting the third gear, means for driving said mounting means from the input shaft, an output shaft, means for driving the output shaft from one of the side gears, a rotatably mounted interlocking shaft having a pair of locking arms secured thereto for rotation therewith, a pair of revolution counters each adapted to be respectively actuated by the rotation of one of said side gears, each of said revolution counters having an arm adapted to coact with respective locking arms, each of said side gears having an arm adapted to coact with respective locking arms, whereby one of said side gears is always immobilized, means responsive to a predetermined movement of the free side gear for actuating its revolution counter arm to rotate its locking arm to free the theretofore immobilized side gear and substantially simultaneously move the other locking arm to immobilize the theretofore free side gear.

4. An output shifting apparatus as in claim 3 in which said revolution counter arm and said locking arm form an angle of substantially 90° with each other when in position locking one of said side gears.

5. An output shifting apparatus as in claim 3 in which said locking arms carried by said interlocking shaft form an angle of substantially 60° with each other.

6. An output shifting apparatus as in claim 3 in which said revolution counter arm is biased to move toward locking position and stop means for stopping said revolution counter arm in a position at which it forms an angle of substantially 90° with its coacting locking arm.

7. An output shifting apparatus as in claim 3 in which one of said revolution counters comprises a housing, means for rotatably mounting said housing, a screw rotatably carried by said housing, means for rotating said screw from the side gear with which the revolution counter is associated, a nut carried by said screw, a gear associated with said nut for rotation therewith, a gear having elongated gear teeth meshing with the nut gear, means for rotating said elongated gear in phase with said screw at a speed different than that at which the screw is rotated whereby said nut will travel along said screw at a rate which is a function of the difference in rotation between the screw and said elongated gear, and means for stopping the motion of the nut after a predetermined rotation of said screw.

8. An output shifting apparatus including in combination a differential having input means and a pair of output means, means driven by one of said output means, means for immobilizing the other of said output means, a revolution counter having means normally locking the immobilized output means, means actuated by the free output means for actuating the revolution counter, and means responsive to the revolution counter for freeing the locked output means after a predetermined motion of said free output means.

9. An output shifting apparatus including in combination a differential having an input means and a pair of output means, a rotatably mounted interlocking shaft having a pair of locking arms secured thereto for rotation therewith, a pair of revolution counters each adapted to be respectively actuated by one of said output means, each of said revolutions counters having an arm adapted to coact with a respective locking arm, each of said output means having an arm adapted to coact with respective locking arms whereby one of said output means is always immobilized, means responsive to a predetermined movement of the free output means for actuating its revolution counter to rotate its locking arm to free the theretofore immobilized output means and substantially simultaneously move the other locking arm to immobilize the theretofore free output means.

References Cited in the file of this patent

UNITED STATES PATENTS

| Number | Name | Date |
| --- | --- | --- |
| 1,377,844 | McCutcheon | May 10, 1921 |
| 1,667,640 | Stroud | Apr. 24, 1928 |
| 1,792,567 | Breithing | Feb. 17, 1931 |
| 2,078,161 | Rietsch | Apr. 20, 1937 |
| 2,217,971 | Smith | Oct. 15, 1940 |
| 2,473,566 | Brassell | June 21, 1949 |

FOREIGN PATENTS

| Number | Country | Date |
| --- | --- | --- |
| 473,542 | Great Britain | Oct. 15, 1937 |